United States Patent [19]

Matsuda et al.

[11] E Patent Number: Re. 33,185

[45] Reissued Date of Patent: Mar. 20, 1990

[54] CAMERA WITH AUTOFOCUSING DEVICE

[75] Inventors: Mutsuhide Matsuda; Shuichi Tamura, both of Yokohama; Hideo Tamamura, Tokyo, all of Japan

[73] Assignee: Canon Kabushiki Kaisha, Tokyo, Japan

[21] Appl. No.: 328,660

[22] Filed: Dec. 3, 1981

Related U.S. Patent Documents

Reissue of:

[64] Patent No.: 4,199,235
Issued: Apr. 22, 1980
Appl. No.: 962,074
Filed: Nov. 20, 1978

[30] Foreign Application Priority Data

Nov. 26, 1977 [JP] Japan ..... 54-141813
Dec. 2, 1977 [JP] Japan ..... 54-144741

[51] Int. Cl.[4] ..... G03B 3/00; G03B 7/08; G03B 17/38

[52] U.S. Cl. ..... 354/402; 354/408; 354/469; 354/195.11; 354/268

[58] Field of Search ..... 354/25, 27, 32, 127, 354/128, 139, 149, 163, 165, 195, 196, 198, 266, 268, 289, 400, 402, 423, 447, 289.1, 408, 195.1, 195.11, 127.1, 469; 352/140; 355/56

[56] References Cited

U.S. PATENT DOCUMENTS

| | | | |
|---|---|---|---|
| 3,547,017 | 12/1970 | Harvey | 354/25 A X |
| 3,617,128 | 11/1971 | Harvey | 354/163 X |
| 3,618,499 | 11/1971 | Harvey | 354/25 A X |
| 3,917,395 | 11/1975 | Ogawa | 354/34 X |
| 3,945,023 | 3/1976 | Stauffer | 354/25 R |
| 4,002,899 | 1/1977 | Stauffer | 354/25 P X |
| 4,031,383 | 6/1977 | Hosoe et al. | 352/140 X |
| 4,080,531 | 3/1978 | Stauffer | 250/204 |
| 4,146,316 | 3/1979 | Osawa | 354/25 P X |
| 4,154,517 | 5/1979 | Tamura et al. | 354/198 X |
| 4,238,153 | 12/1980 | Imura | 354/195 |

*Primary Examiner*—W. B. Perkey
*Attorney, Agent, or Firm*—Fitzpatrick, Cella, Harper & Scinto

[57] ABSTRACT

A camera comprises an exposure meter having a pointer deflected to a position dependent upon the brightness level of an object to be photographed, a scanning mechanism actuated by a camera release to scan the position of the deflected pointer with the scanning result being introduced to a lens aperture mechanism, an automatic focus adjusting device actuated by the camera release to control the focusing of an objective lens in accordance with a photoelectrically sensed distance from the camera to the object, and a control mechanism. Since the photoelectric elements in measuring the object distance have a relatively long time lag, the control mechanism functions upon actuation of the camera release to defer the actuation of the scanning mechanism and the autofocusing device, pending completion of the detection of the object distance. In this manner, an exposure setting accurately corresponding to the prevailing lighting conditions is obtained. When the light value is too low to assure the satisfactory operation of the automatic focus adjusting device, the camera may be switched to the flash mode where the objective lens and the aperture mechanism are automatically set in a pan-focus condition in response to actuation of the camera release.

16 Claims, 6 Drawing Sheets

CAMERA WITH AUTOFOCUSING DEVICE

Matter enclosed in heavy brackets [ ] appears in the original patent but forms no part of this reissue specification; matter printed in italics indicates the additions made by reissue.

BACKGROUND OF THE INVENTION

This invention relates to photographic cameras having a diaphragm-setting scanning mechanism with autofocus mechanism, and, more particularly, to improvements in photographic cameras of the type wherein actuation of the diaphragm-setting scanning and autofocus mechanism is deferred pending completion of the detection of a camera-to-object distance when the camera is set for operation in daylight and wherein the camera objective and the diaphragm mechanism are set in a pan-focus condition automatically when the exposures are made in flash light.

Cameras having a diaphragm-setting scanning mechanism associated with an exposure meter are known. The exposure meter has a pointer deflected to a position dependent upon the brightness level of an object to be photographed. When a shutter release button is depressed to a first stroke, the deflected pointer is clamped, and the position of the clamped pointer is scanned with the scanning result being introduced into the diaphragm mechanism of the camera. After that, the shutter of the camera is released.

On the other hand, automatic focus adjusting devices for still cameras which employ photoelectric elements of slow light response characteristics as a distance detector require a considerably long time interval from the moment at which the camera release has been actuated to the moment at which the shutter is released.

The incorporation of such automatic focus adjusting device in the aforesaid type of camera will, therefore, lead to a high possibility of failing a correct exposure setting as the prevailing lighting conditions rapidly change in intensity after the camera release is actuated, since the deflected pointer of the exposure meter is made to be clamped at the first stroke of the shutter button.

Accordingly, it is an object of the present invention to provide a camera having a diaphragm-setting scanning mechanism associated with an exposure meter and having incorporated therein an automatic focus adjusting device while still permitting assurance of an exposure setting [eccurately] *accurately* corresponding to the prevailing lighting conditions.

To achieve this, the present invention contemplates the use of a control mechanism for deferring actuation of the scanning and autofocus mechanisms pending completion of the distance measurement by a photoelectric detector which is actuated when a camera release is actuated.

In accordance with a further feature of the invention, when the light value sensed by the exposure meter is beyond the lower limit of a dynamic range of the distance detector, the camera may be set to the flash mode where the photo-taking lens and the diaphragm mechanism are moved to a pan-focus condition in automatic response to actuation of the camera release.

BRIEF DESCRIPTION OF THE DRAWINGS

The present invention, and its object and advantages will become more apparent in the detailed description of the preferred embodiments presented below in conjunction with the accompanying drawings in which.

DESCRIPTION OF THE PREFERRED EMBODIMENTS

Figure 1:
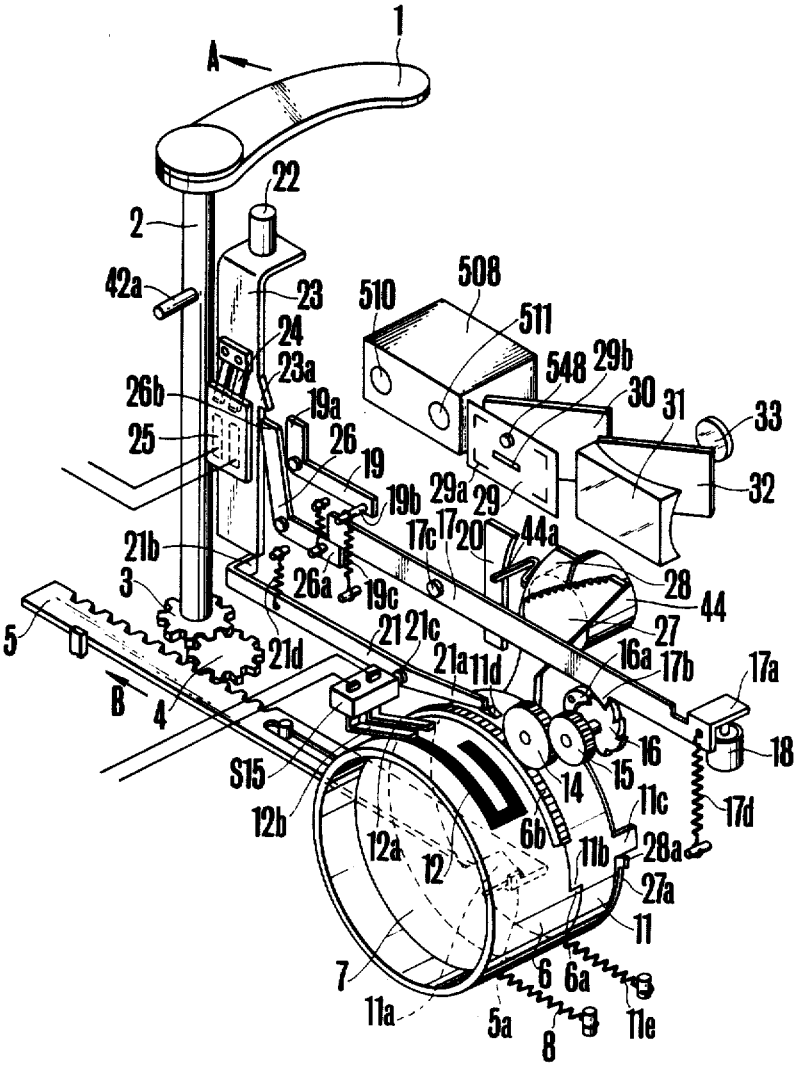
FIG. 1 is a perspective view of the basic parts of one embodiment of a camera according to the present invention.

Referring to FIG. 1, a camera for daylight photography is shown in an operative position where a film winding lever 1 is cocked, reaching the terminal end of movement in a counter-clockwise direction. The camera essentially comprises a diaphragm-setting scanning mechanism 27 associated with an exposure meter 44, an autofocus mechanism, a distanct detector associated with a finder 29 to 33, a control mechanism, a camera release 22 to 25, and a reset mechanism, each of which will now be described.

The autofocus mechanism includes a focusing ring 6 rotatable about an optical axis of an objective lens 7. Upon rotation of the ring 6 in a counter-clockwise direction under the action of a spring 8, the objective lens 7 is axially moved to effect focusing down to suit shorter object distances. Such movement takes place when a reset ring bar 11 is no longer effective to engage at its shoulder 11b with a stepped-down portion 6a of the focusing ring 6 and to maintain the latter in the cocked position for a point beyond a focusing range. To detect the phase of rotation of the focusing ring 6 there is provided a variable resistor 515 (FIG. 2) constructed from a resistance track of U-shape 12 on the outer peripheral surface of the ring 6 and a pair of sliders 12a and 12b fixedly mounted on a camera housing (not shown) through an electrical insulator [15] *S15* in alignment with respective sections of the resistance track 12. The focusing ring 6 is further provided with a gear 6b formed in a portion of the outer peripheral surface thereof at its rear end and meshing with a gear 14 which meshes with an intermediate gear 15. The gear 15 is drivingly connected through a one-way clutch (not shown) to a stop wheel 16 for an arresting pawl 17b of a multi-purpose lever 17. An ankle 16a adjacent the gear 16 functions to maintain the speed of rotation of the focusing ring 6 constant.

The diaphragm setting mechanism comprises a scanning member 27 and a clamping member 28, both of which are rotatable about the optical axis of the objective lens 7 in the rear of the common reset ring bar 11 of the focusing ring 6. Since the exposure meter 44 operates from the time of closure of a main switch (not shown) and a pointer 44a is deflected to a position dependent upon the level of brightness of an object to be photographed, when the ring bar 11 is turned by the action of a spring 11e to move its rearwardly extending projection 11c away from radial projections 27a and 28a of the scanning and clamping members, the pointer 44a is pressed against a stationary abutment 20 by the clamping member 28 under the action of a spring (not shown) and then the scanning member 27 with steps thereon is brought into contact with the pointer 44a by a spring (not shown). In this manner, the final position of the scanning member 27 depends upon the position of the deflected pointer 44a. The scanning result is introduced to a diaphragm mechanism (not shown) of the camera.

Figure 2:
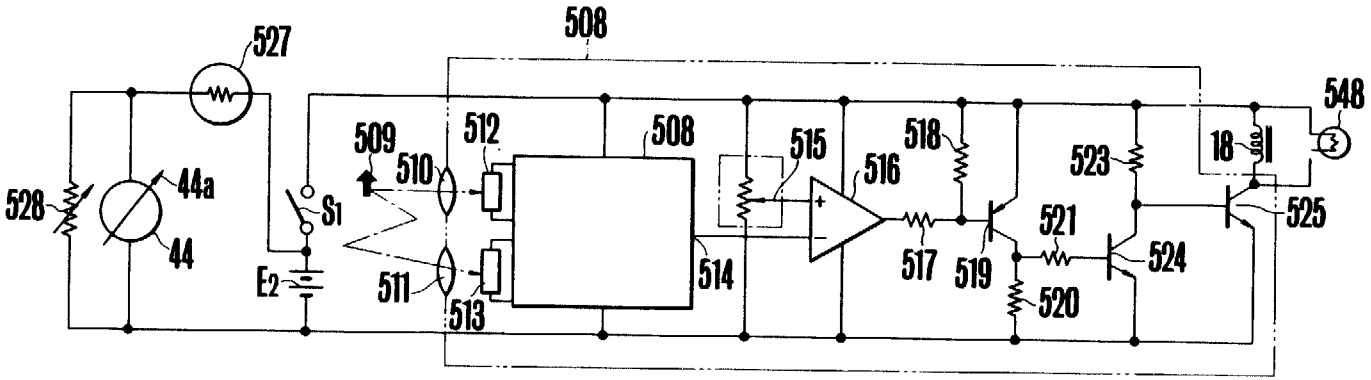
FIG. 2 is a schematic electrical circuit diagram of an exposure meter and an autofocusing device of FIG. 1.

With reference also to FIG. 2, the distance detector includes an image sharpness determining circuit 508 with a pair of photoelectric elements 512 and 513 positioned to receive real images of the common object 509 formed by respective lenses 510 and 511 which, in this instance, are made permanently stationary relative to the photoelectric elements 512 and 513 as in U.S. Pat. No. 3,945,023, or Japanese patent application No. Sho 52-505 assigned to the assignee of the present invention. After the camera release is actuated at a button 22 to close a switch $S_1$, at the termination of duration of a time interval dependent upon the time lag of the photoelectric elements 512 and 513, the circuit 508 produces an electrical signal having a magnitude proportional to a distance from the camera to the object 509. Upon advent of this signal on an inversion input of a comparator 516, a switching circuit 517 through 525 is rendered operative to energize a magnetic winding 18 and an indicator lamp 548 with electrical power [supply] *supplied* from a battery $E_2$. As disclosed in U.S. Pat. No. 4,002,899, the distance detector may be otherwise constructed by having one of the lenses 510 and 511 made movable in mechanical linkage with a focus setting scanner upon attainment of a least difference between the degrees of sharpness of the images on the photoelectric elements 512 and 513 to cause a control signal for the magnetic winding 18 to appear at an output terminal 514 of the circuit 508.

Figure 6:
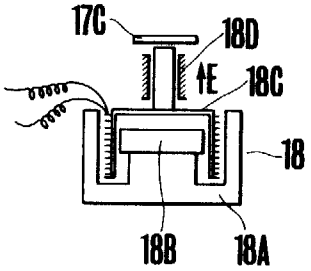
FIG. 6 is a sectional view of an electromagnet actuator for the control mechanism of the invention.

As shown in FIG. 6, the magnetic winding 18 is fixedly carried around a sleeve 18C which lies in a circular space formed in a round yoke 18A of magnetic material. The central cylindrical core of the yoke 18A is halved in height to receive a permanent magnetic disc 18B thereon. The yoke 18A is fixedly mounted on the camera housing, while the armature sleeve 18C is suspended by a vertical bar 18D movable in a fitted hole of the camera housing.

Turning again to FIG. 1, when the magnetic winding 18 is energized at the time of completion of the distance detection, the armature 18C is repelled so as to move upward, causing the vertical bar 18D to push a release lever 17 at a rectangularly bent-off portion 17a thereof. A catch lever 26 is connected to a spring 26a to provide a positive coupling between the catch lever 26 and the release lever 17 so that counter-clockwise movement of the lever 17 about a pivot pin 17c causes clockwise movement of the catch lever 26 with the arm 26b taken out of engagement with a projection 23a of a camera release slide plate 23. The release lever 17 further serves as an actuating lever for a latch lever 19 of a shutter (not shown). A spring 19c attached to a pin 19b effects an engagement of the latch lever 19 with the actuating lever 17, while the other arm 19a is arranged to latch the shutter in a pre-exposure position when the lever 17 is turned counter-clockwise. The parts 17, 18 and 26 constitute the control mechanism for deferring actuation of the diaphragm-setting scanning mechanism, the autofocus mechanism, and the shutter mechanism.

The reset mechanism comprises a gear 3 fixedly secured to a shaft 2 at the bottom end thereof, the top end of which has the lever 1, an imtermediate gear 4 meshing with the gear 3, and a slidable gear rack 5 driven by the intermediate gear 4 upon movement of the film winding lever 1 in a direction indicated by an arrow A to rotate the ring bar 11 by a tab 5a engaging with a rearwardly extending arm 11a to a position illustrated where it is latched at 11d by a latch lever 21, while [simultaneoulsy] *simultaneously* tensioning the springs 8 and 11e and the ones which are not shown for the clamping and scanning members 28 and 27.

The camera further includes a finder comprising a mask 29 with four corner marks 29a defining an effective area of the field of view and with a central spot mark 29b assisting in measuring the camera-to-object distance, a total reflection mirror 30 disposed to direct light from the mask 29 to a half mirror 32 and therefrom to an eye-piece 33, and an objective lens 31 arranged on an optical axis of the eye-piece 33 in front of the half mirror 32. The indicator of FIG. 2 is positioned on the mask 29 at 548 in the field of view of the finder.

In operating the camera, after the lever 1 has been cocked to advance a film (not shown) one frame at a time for exposure and to reset the shutter through a pin [2a] *42a* radially extending from the shaft 2, the operator needs to retract the lever 1 from the illustrated position where the tab 5a is moved away from the path of movement of the arm 11a. At this time, the ring bar 11 is effective to maintain the diaphragm-setting scanning mechanism and the autofocus mechanism in the reset positions against the bias of the springs 8 and 11e.

Looking through the eye-piece 33, the operator will align the camera to a scene to be photographed with the help of the mask 29 to which an image is overlapped on a virtual image of the scene formed by the concave lens 31. A subject 509 of principal photographic interest is assumed to be located at the center in the field of view as is sighted by the mark 29b, then the operator may depress a release button 22 to a position where the slide 23 is stopped from further downward movement by the catch lever 26 and where a pair of brushes 24 are in contact with respective electrically conductive patterns 25 on an electrically insulated substrate, that is, the switch $S_1$ is closed. Upon closure of the switch $S_1$, the distance determining circuit 508 is connected to the battery $E_2$, but the magnetic winding 18 remains deenergized as *it* is cut off therefrom by a transistor 525 which is non-conducting. Responsive to the images of the subject 509 formed by the lenses 510 and 511 on the photoelectric elements 512 and 513, after [elapse] *lapse* of a time interval, the circuit 508 produces an electrical signal representative of the camera-to-object distance, and this signal is applied from the output terminal 514 to actuate the operational amplifier 516 at the time at which the transistor 525 is rendered conducting to start energization of the magnetic winding 18 and of the indicator lamp 548.

Such energization of the magnetic winding causes the armature 18C to turn the multi-purpose lever 17 about the pin 17c in the counter-clockwise direction against the force of a bias spring 17d. The arresting pawl 17b is thereby disengaged from the stop wheel 16 to make the gear train 14, 15 and 16 ready to operate as a governor, the catch lever 26 is disengaged from the slide projection 23a, and the latch lever 19 is brought into engagement with the shutter. Since the operator is informed of this fact by the indicator lamp 548 being lighted, upon further depression of the release button 22 from the first to the second stroke, the latch lever 21 is turned about the pivot pin 21c against the force of a spring 21d to disengage the arm 21a from the projection 11d, so that the ring bar 11 is rotated in the counter-clockwise direction by the drive spring 11e. The clamping and scanning members 28 and 27 follow up the ring bar 11, reaching the pointer 44a in sequence just before the focusing ring 6 is rotated to a position where the photo-taking lens 7 is focused for an infinitely distant object, and where the variable resistor 12 (515 in FIG. 2) takes a resistance value at infinity, as the speed of rotation of the focusing ring 6 is regulated by the governor to a slower constant value than that of rotation of the members 27 and 28. Further rotation of the focusing ring 6 causes forward movement of the lens 7 to effect focusing down to shorter object distances with decrease in the resistance of the variable resistor. When the voltage at the output of the resistor 515 has reached a threshold level for the comparator 516, the switching circuit is inverted to de-energize the magnetic winding 18.

Such de-energization of the magnetic winding 18 causes clockwise movement of the lever 17 by the action of the spring 17d so that the pawl 17b is brought into arresting engagement with one of the teeth of the stop wheel 16. Such movement of the lever 17 also causes counter-clockwise movement of the latch lever 19 to effect an actuation of shutter release. Thus an exposure is initiated at a diaphragm aperture [of] which size depends upon the brightness level of the subject 509 sensed by a photo-cell 527 and occurring just before the photo-taking lens 7 has been focused and upon the sensitivity of the used film set in a variable resistor 528.

After the exposure has been terminated, the operator will turn the lever 1 in the counter-clockwise direction A. During the film winding and shutter cocking operation, the reset gear rack 5 is driven by the gear [5] *4* to move to the left as is guided by a pin-and-slot engagement, while simultaneously rotating the ring bar 11. The reset bar 11 at first engages again with the focusing ring 6 at 6a and 11b. Then, when the rest bar 11 nears the terminal end of movement, it engages with the scanning and clamping members 27 and 28. Finally, the diaphargm-setting scanning mechanism and autofocus mechanism are reset in the illustrated positions.

Figure 3:
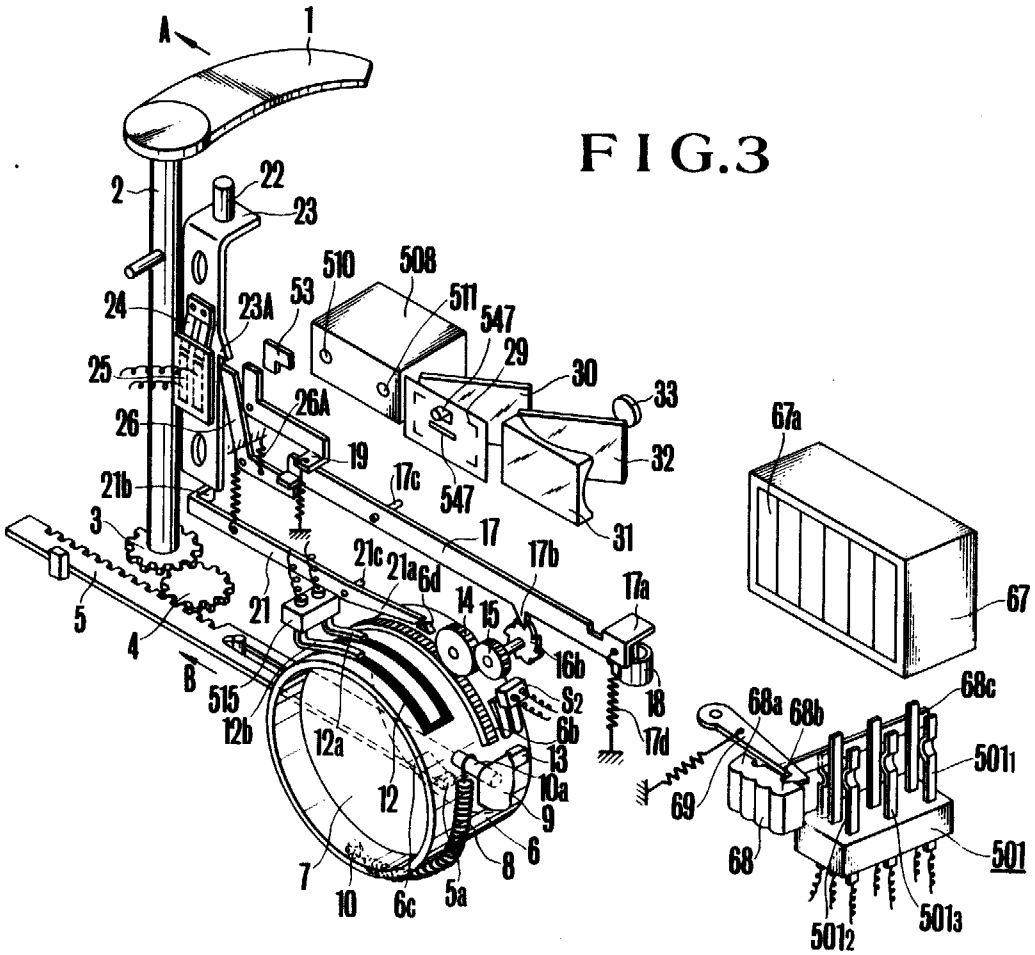
FIGS. 3 and 4 are perspective views of the basic parts of another embodiment of a camera for daylight and flash photography according to the present invention with FIG. 3 showing an autofocus mechanism with pan-focus setting means and with FIG. 4 showing a diaphragm-setting scanning mechanism and a shutter control mechanism.
Figure 4:
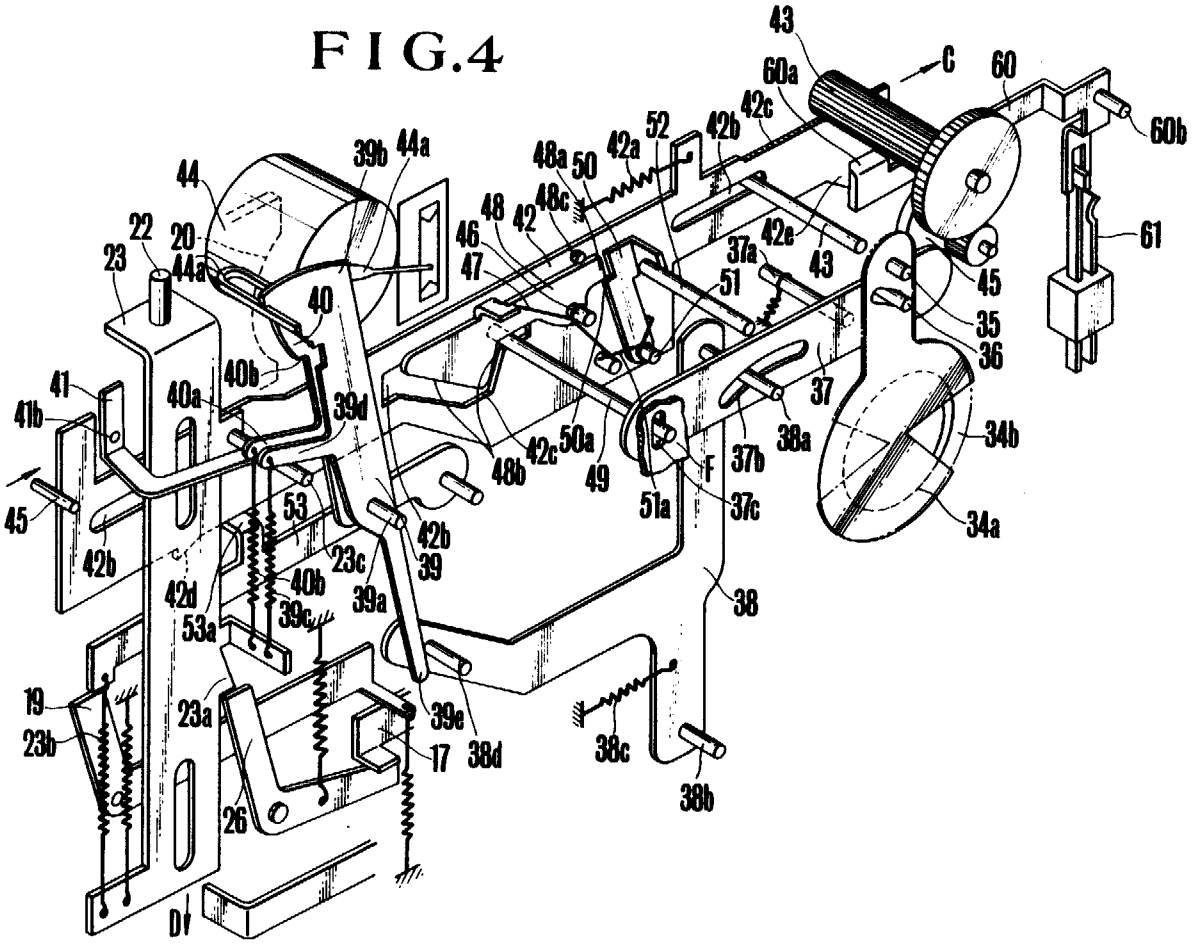
Figure 5:
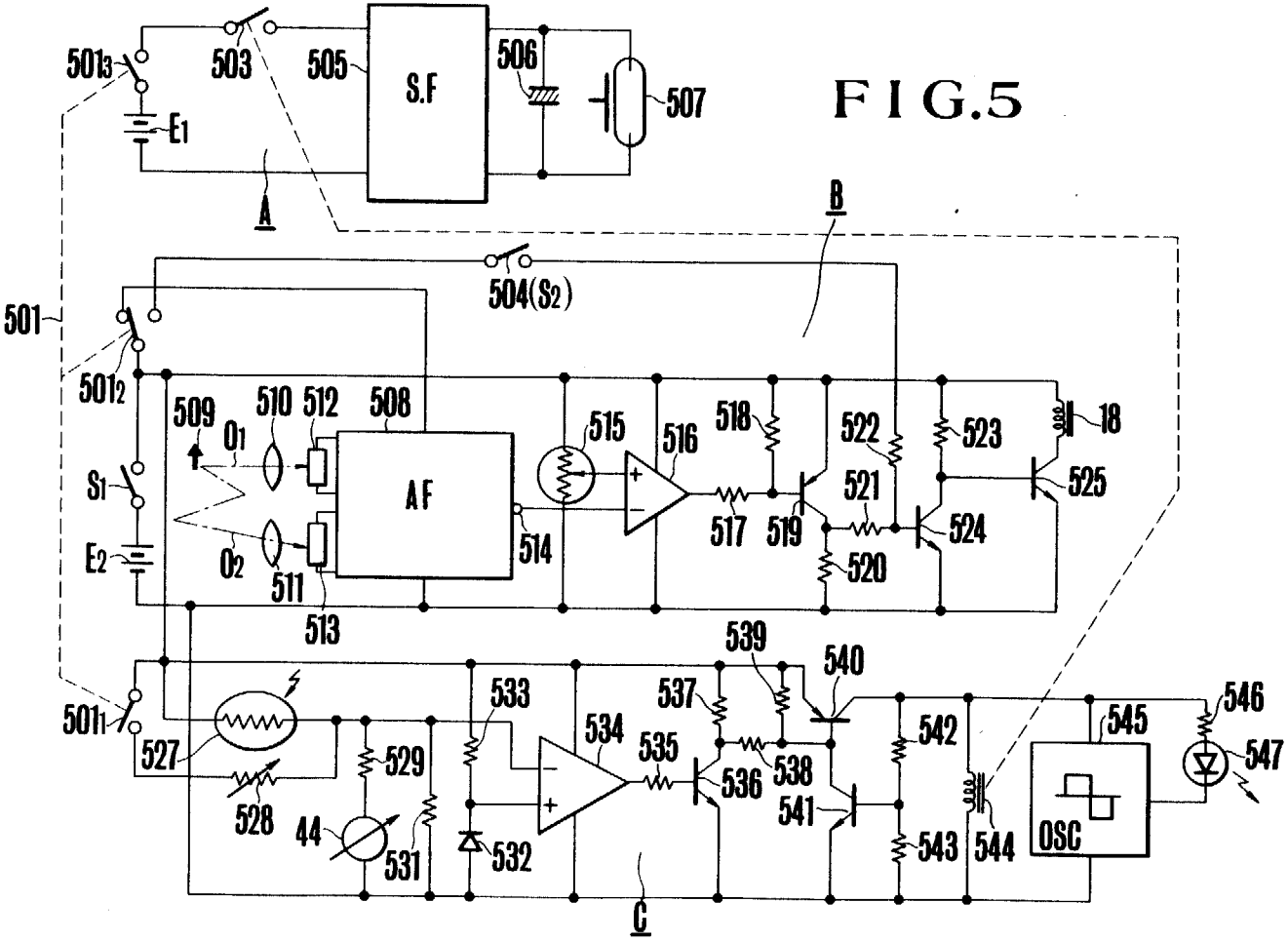
FIG. 5 is a schematic electrical circuit diagram, partly in block form, of the camera of FIGS. 3 and 4.

FIGS. 3 to 5 show another embodiment of the present invention applied to a camera for daylight and flash photography wherein the same reference numerals have been employed to denote similar parts to those shown in FIGS. 1 and 2. In FIG. 3, the reset bar 11 of [the] FIG. [11] *1* is omitted and instead the focusing ring 6 is provided with a rearwardly extending arm 6c for engagement with the reset gear rack 5 and a radial projection 6d for engagement with the latch lever 21. The driving spring 8 is tensioned between a pin 10 on the ring 6 and a pin 10a on a support framework 9 of the mechanical mounting for the lens 7. The ankle 16a of FIG. 1 is omitted so that the gear train 14, 15 and 16 functions only as a part of the arresting mechanism.

A device is provided for automatically setting the focusing ring 6 in a pan-focus condition when flash exposures are made. The device comprises an electrically conductive member 13 fixedly mounted on the outer peripheral surface of the focusing ring 6 through an insulator at such a location that it contacts with two brushes $S_2$ when the focusing ring is rotated in a counter-clockwise direction to set the photo-taking lens 7 in a pan-focus condition.

A stroboscopic lamp is enclosed in a casing 67 with a dust-proof window 67a constituting part of the front panel of the camera housing. Three switch elements $501_1$, $502_2$ and $501_3$ are assembled by a base of insulating material and are arranged adjacent a common actuator 68c having a knob 68 accessible from the outside of the camera housing. The knob 68 is provided with detent slots 68a and 68b upon reception of a pawl of a click lever 69 to select either of the flash and daylight modes respectively.

In FIG. 4, there is shown an exposure regulating mechanism whose diaphragm blades 34a and 34b serve as shutter blades. The blades 34a and 34b are pivotally suspended at a pin 35 on a framework (not shown) of the camera and have slots formed therein in which a drive pin 36 is engaged. The drive pin 36 is fixedly carried by a lever 37 constituting a lever differential together with a second lever 38. A scanning member or lever 39 and a clamping member or lever 40 are pivotally mounted on a pin 39a.

When the release button 22 is depressed to the first stroke, the switch $S_1$ is closed to connect the exposure meter 44 with the battery $E_2$. When in daylight mode, such closure of the switch $S_1$ also causes connection of the distance determining circuit 508 with the battery. Upon completion of the distance determination, the magnetic winding 18 is energized to take the catch lever 26 out of the path of movement of the projection 23a, so that the slide plate 23 is made movable further downward. Before the slide plate 23 strikes the latch lever 21, the clamping and scanning levers 40 and 39 are turned in a counter-clockwise direction to press the pointer 44a against the stationary abutment 20 as the slide plate 23 is connected through tension springs 40b and 39c to the clamping and scanning levers 40 and 39 at their arms 40a and 39d respectively. The scanning motion of the lever 39 is transmitted to the three-armed lever 38 through a positive coupling between a lever arm 39e and a pin 38d which is effected by a spring 38c. In this manner, the position of the deflected pointer 44a is translated to a relative position of a fulcrum 38a for the first lever 37 to an arcuate slot 37b.

Assuming that the light value is beyond the lower limit of a dynamic range of exposure control, a recess below the steps 39b of the scanning lever 39 receives the pointer 44a, whereby a lock lever 41 is turned about a pivot pin 41b in a clockwise direction by the arm 39d to prevent the slide plate 23 from actuating the latch lever 21.

An actuating plate 42 is shown in a released position. When the lever 1 of FIG. 3 is cocked, the actuating plate 42 is moved to the right or in a direction indicated by an arrow C as is guided by pin-and-slot engagement while simultaneously charging a drive spring 42a. During this operation, the blades 34a and 34b are maintained closed since a pawl lever 50 was disengaged from a control lever 48 to 50a and 48a by a stationary pin 52 on the framework at the released position, and, therefore the control lever 48 is turned in a clockwise direction about a pivot pin 46 against a bias spring 47 to permit a shutter opening-up pin 49 to remain stationary. In a rightmost or cocked position, the actuating plate is latched by a latch lever 53, as the lever 19 bears the free end of the latch lever 53 under the action of the spring 19c which overcomes a bias spring 53b to bring a pawl 53a into abutting engagement with a lug 42d. A mechanism for controlling the opening and closing operation of the blades 34a and 34b comprises a cam lever 48 pivotally mounted on a pin 46 laterally extending from the actuating plate 42, a hairpin spring 47 urging the cam lever 48 for counter-clockwise movement, a stopper 48c for limiting the counter-clockwise movement of the lever 48, a latch lever 50 pivotal about a pin 51 on the actuating plate 42, a hairpin spring 51a urging the latch lever 50 to engage at its hook 50a with a lug 48a of the cam lever 48 when in the cocked position, a disengagement pin 52 positioned on the framework to disengage the latch lever 50 from the cam lever 48 when in the released or illustrated position, and an operating member or rod 49 extending into an opening 42b in the actuating plate 42 under a V-shaped camming surface [48a] *48b* of the lever 48 at one end thereof, the opposite end of which extends through a fitted hole (not shown) of the lever 37 into a vertically elongated slot 37c formed in the wall of the framework F.

An X sync contactor 61 for the stroboscope 67 is positioned to be actuated through a two-armed lever 60 by the actuating plate 42 at a moment when the blades 34a and 34b are fully opened. For this purpose, one arm of the lever 60 is forked to receive a movable contact of the switch 61, while the other arm extends into the path of movement of a cam lobe 42e of the rightmost lower portion of the plate 42.

FIG. 5 shows the circuitry of the camera of FIGS. 3 and 4 comprising a stroboscopic lamp firing circuit A, an automatic focus adjustment control circuit B of similar construction to that of FIG. 2 circuit provided with a pan-focus setting circuit, an automatic exposure control circuit C associated with an out-of-range warning display circuit, and a mode selection circuit, each of which will now be described.

The firing circuit A includes the mode selection switch element $501_3$ connecting an electrical power source or battery $E_1$ to a D.C.-to-D.C. voltage boosting circuit 505 when the knob 68 is set in flash mode. Responsive to the output of an out-of-range detecting circuit in block C, an additional switch 503 is closed which is connected in the power supply line to the boosting circuit 505. A main flash capacitor 506 is connected to the output of the circuit 505 and across the anode and cathode of a flash lamp such as a xenon-filled glass tube whose trigger electrode is connected to the X contact 61 through a transformer (not shown).

In block B, when in daylight mode, the distance determining circuit 508 is selected by the switch element $501_2$ for cooperation with the magnetic winding 18 in a manner similar to that described in connection with FIGS. 1 and 2. In flash mode, however, a switch 504 constructed from the members 13 and $S_2$ of FIG. 3 is rendered effective by the switch $501_2$ to control actuation of the magnetic winding 18, after the switch $S_1$ is closed.

In block C, an automatic exposure control circuit for daylight and flash photography comprises a photo-cell 527, a semi-fixed resistor 528 connected in parallel to the photo-cell 527 through the mode selection switch element $501_1$ upon closure to set a diaphragm aperture at F/5.6 or F/4 with the help of the exposure meter 44, and a resistor 529 connected in the input stage of the meter 44 to compensate for ambient temperature variation. The sensitivity of the used film may be factored into the daylight exposure value by having a film speed dependent aperture means positioned in front of the photo-cell 527. When factored into the flash exposure value, the semi-fixed resistor 528 is made adjustable by film speed dial (not shown).

The out-of-range detecting circuit comprises a comparator 534 having an inversion input connected to the output of the photo-cell 527 and having a non-inversion input connected to an output of a constant voltage source of a resistor 533 and a diode 532 for reference voltage corresponding to the lower limit of a dynamic range of the distance determining circuit 508, and a switching transistor 536 with a base connected through a resistor 535 to the output of the comparator 534, with an emitter connected to the circuit earth, and with a collector connected through a resistor 537 to the positive bus.

A power supply control transistor 540 for a relay coil 544 controlling the operation of the switch 503 has a base connected through a resistor 538 to a junction between the resistor 537 and the transistor 536. A power supply holding transistor 541 is connected between the base of the transistor 540 and the circuit ground with its base being connected to a junction between resistors 542 and 543 which resistors are connected between the collector of the transistor 540 and the circuit ground.

The display circuit comprises an oscillator 545 actuated by the conduction of the power supply control transistor 540 to energize a light-emitting diode 547 intermittently. This display element 547 is positioned in the finder so as to be visible in the field of view by the operator looking through the eye-piece 33.

In operating the camera of FIGS. 3 to 5, when the film winding lever 1 is cocked in the direction indicated by arrow A, the gear rack 5 and the actuating plate 42 are driven to move in the directions indicated by arrows B and C respectively, while tensioning the springs 8 and 42a, to their positions where the focusing ring 6 is latched by the latch lever 21 and where the actuating plate 42 is latched by the latch lever 53.

When an exposure is to be made in daylight mode, the knob 68 is set in the illustrated position where the switch elements 501 are all assumed in FIG. 5 positions. Upon depression of the shutter button 22 to the first stroke, the switch $S_1$ is closed to start operation of the distance determining circuit 508 and the exposure control circuit C. Now assuming that the light value sensed by the meter 44 is sufficiently large to assure the accurate detection of the camera-to-object distance, then the power supply control transistor 540 remains in the non-conducting state, and therefore the display element is not lighted. This informs the operator of the fact that automatic focusing of the photo-taking lens 7 may be performed.

Upon completion of the distance detection, the magnetic winding 18 is energized to permit further downward movement of the slide 23 which causes actuation of the clamping and scanning levers 40 and 39 and then of the autofocus mechanism. When the photo-taking lens 7 is focused for the subject distance, the magnetic winding 18 is de-energized to arrest the focusing ring 6 and to actuate the shutter. As the actuating plate 42 is driven by the spring 42*a*, a governor comprising a gear 43 meshing with a rack 42c of the plate 42, and a fly wheel 45 connected to the gear 43 through a gear train [44] regulates the speed of motion of the plate 42 constant. As the plate 42 is moved, the operating pin 49 moves downward in sliding engagement on the camming surface 48b and then upward in sliding engagement on the camming surface 42c. The blades 34a and 34b are opened and closed to effect an exposure at a diaphragm aperture dependent upon the position of the deflected pointer 44a.

Alternatively, assuming that the light value is below a satisfactory operating level for the autofocusing device, when the button 22 is depressed to the first stroke, the light-emitting diode 547 intermittently glows and the relay coil 544 is energized to close the switch 503. It is to be noted here that the satisfactory operating lever is not always equal to the lower limit of a dynamic range of exposure control, but it can be said to be preferable for setting this satisfactory operating level at a critical point between daylight and flash exposures by taking into account the advantage of producing clear photographs when taken with flash.

After the knob 68 is moved to the right as viewed in FIG. 3, the operator will further depress the button 22 to disengage the latch lever 21 from the focusing ring 6. This is possible since the lock lever 41 is retracted from the path of movement of the slide 23 because the pointer 44a is deflected to a position for F/5.6 or F/4 by the semi-fixed resistor 528 at the time [of] exposure meter 44 is negligible. When the pan-focus setting member 13 has reached the contacts $S_2$, the switch 504 is closed to de-energize the magnetic winding, causing the stop wheel 16 to be arrested by the pawl 17b. In the flash mode, therefore, a subject of principal photographic interest when situated at a distance ranging from 3 to 5 meters will give sharpest latent images on the film frames in correct exposures.

Figure 7:
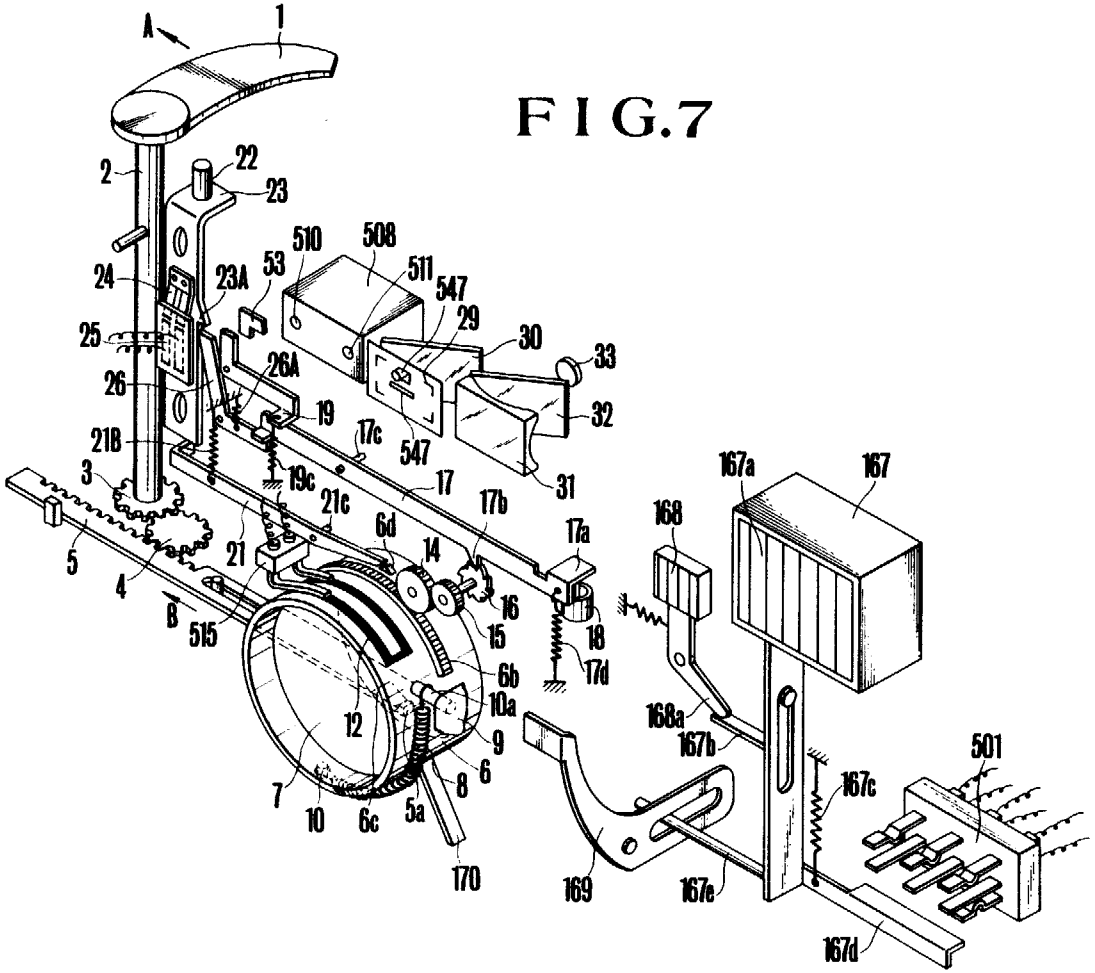
FIG. 7 is a similar view to that of FIG. 3 with modification of the pan-focus setting means.

FIG. 7 shows a slightly modified pan-focus setting mechanism from that shown in FIG. 3, as the preset invention is applied to a camera of the type in which when in flash mode a stroboscopic lamp device 167a hops up the upper panel of the camera housing to create a sufficiently large distance between the optical axis of the photo-taking lens 7 and the flash light beam to prevent occurrence of so-called "Red Eye Phenomena." In this respect, some of the same numerals have been employed to denote corresponding parts as in FIG. 3. The stroboscopic lamp device 167 is mounted on the top end of a vertical slide having a first extension 167b arranged upon depression of a button 168 to be disengaged from the lever 168a so that the lamp device 167a is moved upward by a spring 167c. As the slide is moved, second and third extensions 167d and 167e act on the switch element assembly 501 and a lever 169 respectively. Thus the switch element assembly 501 selects the flash mode, and one arm of the lever 169 extends into the path of movement of a projection 170 radially extending from the focusing ring 6 at a point such that the photo-taking lens 7 is set in a pan-focus condition when the autofocusing mechanism is actuated. In this case, the first stroke of depression of the shutter button 22 leads to energize the magnetic winding 18, and then the completion of the pan-focus setting is immediately followed by actuation of the shutter release through an intermediary (not shown) cooperative with the projection 170.

It will be understood from the foregoing that the *present invention* not only assures the setting of an exposure value accurately corresponding to the prevailing lighting conditions despite the relatively long time lag of the autofocusing device but also of automatically adjusting an image of a subject of principal photographic interest to an optimum degree of sharpness even when the level of brightness of the subject is too low for the satisfactory operation of the autofocusing device. After the distance measurement has been completed, the period of actuation of the autofocus mechanism takes so short a time that the snap shot photography can be performed without missing good shutter chances. Another advantage is that the arresting of the autofocus mechanism is controlled by a common member for actuating the shutter in order to insure that the camera operates in a very smooth sequential manner regardless of which mode is selected. A further advantage arising from the configuration of the rotation phase detecting resistance track to a letter U in combination with the provision of the gear train for magnifying the change of the phase of rotation of the focusing ring is that the accuracy and reliability of focusing control are remarkably improved.

In the above described embodiments of the invention, the flash photography is performed in the pan-focus condition. The invention however, is not confined to this situation. For example, when in flash mode, the photo-taking lens may be focused for a subject at an intermediate distance. Particularly with a camera of the zone focus type, or a camera having a wide angle lens, it is required to effect production of the condition of sharp focus for a subject at a predetermined distance in the intermediate zone.

What is claimed is:

1. In a camera having an automatic focus adjusting device and an automatic exposure control device, the combination comprises:

(a) a distance measuring circuit including a light receiving element;

(b) a photo-taking lens movably supported for focusing;

(c) an exposure meter;

(d) a scanning member for scanning a pointer of said exposure meter;

(e) latch means for latching said scanning member in an initial position;

(f) stopping means responsive to the output of said distance measuring circuit to be moved for engagement with or disengagement from said photo-taking lens, whereby movement and stoppage of said photo-taking lens is controlled;

(g) a release member arranged upon depression of a shutter button to be moved to a first region for the start of operation of said distance measuring circuit and therefrom to a second region for the start of focusing movement of said photo-taking lens;

(h) preventing means for preventing said release member from moving from said first movement region to said second movement region;

(i) said stopping means being moved in response to the distance measurement completion signal of said distance measuring circuit so that it is taken out of engagement with said photo-taking lens, and upon acting on said preventing means permits movement of said release member to said second movement region; and (j) said latch means being moved to release the latching of said scanning member when said release member is moved to said second region, causing said photo-taking lens to perform focusing operation and causing said scanning member to perform exposure determining operation.

2. A camera according to claim 1, wherein said stopping means controls the movement and stoppage of said photo-taking lens by the action of an electromagnet connected to said distance measuring circuit.

3. A camera according to claim 2, wherein said pointer scanning member is supported rotatably about an optical axis of said photo-taking lens and removably engages with a support tube for said photo-taking lens.

*4. In a camera which is selectively settable to a daylight photography mode and to a flash photography mode and which includes an objective and a manually operable selector for selection of the photographic modes, an automatic focus adjusting device comprising:*

*range finder means for generating a distance signal representative of a distance from said camera to an object;*

*objective setting means responsive to said distance signal for setting said objective at a position where said objective focuses on said object; and*

*control means responsive to the selection of a photographic mode for, upon selection of the flash photography mode, causing said objective setting means to set said objective at a position where said objective focuses on an object at a predetermined distance within the maximum permissible distance for flash photography, and, upon selection of the daylight photography mode, enabling said objective setting means to set said objective in response to said distance signal.*

*5. An automatic focusing camera which is selectively settable to a daylight photography mode and to a flash photography mode, comprising:*

*(A) a focus adjustable objective;*

*(B) an automatic focusing device for automatically focusing said objective;*

*(C) selector means for selection of the photography modes; and*

*(D) control means responsive to the selection of a photography mode for, upon selection of the flash photography mode, causing said automatic focusing device to adjust said objective to a position where said objective focuses on an object at a predetermined distance within the maximum permissible distance for flash photography, and, upon selection of the daylight photography mode, enabling said automatic focusing device to adjust said objective at a position corresponding to an object distance.*

*6. An automatic focusing camera according to claim 5, wherein said automatic focusing device includes:*

*range finder means for generating a signal for adjusting said objective to the position corresponding to the object distance;*

*supplementary means for generating a signal for adjusting said objective to the position where the objective focuses on the object at the predetermined distance; and*

*responsive means for adjusting said objective to one of said positions based on the signal generated by said range finder means or the signal generated by said supplementary means; and*

*wherein said control means causes said supplementary means to be effective upon selection of the flash photography mode.*

*7. An automatic focusing camera according to claim 6, wherein said control means is arranged to cause said range finder means to be ineffective upon selection of the flash photography mode.*

*8. A camera which is selectively settable to a daylight mode and to a flash-light mode, comprising:*

*(a) a focus adjustable objective;*

*(b) an automatic focusing device for automatically focusing said objective; and*

*(c) control means responsive to selection of a mode for, upon selection of the flash-light mode, causing said automatic focusing device to adjust said objective to a position where the objective focuses on an object at a distance within the maximum permissible distance for the flash-light mode, and, upon selection of the daylight mode, enabling said automatic focusing device to adjust said objective at a position corresponding to an object distance.*

*9. A camera according to claim 8, wherein said automatic focusing device includes:*

*range finder means for generating a signal for adjusting said objective to the position corresponding to the object distance;*

*supplementary means for generating a signal for adjusting said objective to the position where said objective focuses on the object at a distance within the maximum permissible distance for the flash-light; and*

*responsive means for adjusting said objective to one of said positions based on the signal generated by said range finder means or the signal generated by said supplementary means; and*

*wherein said control means causes said supplementary means to be effective upon selection of the flash-light mode.*

*10. A camera according to claim 9, wherein said control means is arranged to cause said range finder means to be ineffective upon selection of the flash-light mode.*

*11. A camera which is selectively settable to a daylight mode and to a flash-light mode, comprising:*

*(a) a focus adjustable objective;*

*(b) first focus control means for controlling said objective at a position corresponding to an object distance;*

*(c) second focus control means for controlling said objective at a position where the objective focuses on an object at a distance within the maximum permissible distance for the flash-light mode; and*

*(d) operation control means responsive to selection of a mode for, upon selection of the flash-light mode, causing said second focus control means to be effective.*

*12. A camera according to claim 11, wherein said second focus control means is arranged to control said objective at the position where the objective focuses at a predetermined distance.*

*13. A camera according to claim 12, wherein said operation control means is arranged to cause said first focus control means to be ineffective upon selection of said flash-light mode by said selector means.*

*14. A camera which is selectively settable to a daylight mode and to a flash-light mode, comprising:*

*(a) a focus adjustable lens means;*

*(b) an automatic focusing device for automatically focusing said lens means onto an object, said focusing device including means for stopping movement of said lens means when an in-focus condition of said lens means with respect to the object is obtained;*

*(c) specific position control means for detecting whether said lens means reaches a predetermined position and for activating said stop means in said automatic focusing device when it is detected that the lens means reaches the predetermined position; and*

*(d) operation control means, responsive to selection of a mode, for causing said specific position control means to be effective upon selection of the flash-light mode.*

*15. A camera according to claim 18, wherein the predetermined position is a position where said lens means focuses on the object at a predetermined distance within the maximum permissible distance for the flash-light mode.*

*16. A camera according to claim 14 or 15, wherein said operation control means is arranged to cause said automatic focusing device, but for said stop means, to be ineffective upon selection of said flash-light mode.*

* * * * *

UNITED STATES PATENT AND TRADEMARK OFFICE

CERTIFICATE OF CORRECTION

PATENT NO. : Re. 33,185

DATED : March 20, 1990

INVENTOR(S) : MUTSUHIDE MATSUDA ET AL.

It is certified that error appears in the above-identified patent and that said Letters Patent is hereby corrected as shown below:

ON TITLE PAGE:

AT [30] FOREIGN APPLICATION PRIORITY DATA

"54-141813" should read --52-141813--.
54-144741 52-144741

COLUMN 2

Line 30, "distanct" should read --distance--.

COLUMN 4

Line 6, "imtermediate" should read --intermediate--.

COLUMN 5

Line 45, "rest bar 11" should read --reset bar 11--.
Line 48, "phargm-setting" should read --phragm-setting--.
Line 54, "reset bar 11" should read --reset ring bar 11--.

COLUMN 6

Line 8, "$501_1$, $502_2$ and $501_3$" should read --$501_1$, $501_2$ and $501_3$--.

COLUMN 9

Line 33, "preset" should read --present--.
Line 42, "device 167" should read --device 167a--.

UNITED STATES PATENT AND TRADEMARK OFFICE

CERTIFICATE OF CORRECTION

PATENT NO. : Re. 33,185

DATED : March 20, 1990

INVENTOR(S) : MUTSUHIDE MATSUDA ET AL. Page 2 of 2

It is certified that error appears in the above-identified patent and that said Letters Patent is hereby corrected as shown below:

COLUMN 10

Line 3, "snap shot" should read --snapshot--.

COLUMN 12

Line 60, "*claim 18,*" should read.--*claim 14,*--.

Signed and Sealed this

Nineteenth Day of November, 1991

*Attest:*

HARRY F. MANBECK, JR.

*Attesting Officer*

*Commissioner of Patents and Trademarks*